US005161421A

United States Patent [19]

Stigsson

[11] Patent Number: 5,161,421

[45] Date of Patent: Nov. 10, 1992

[54] DRIVING DEVICE FOR DRIVING OR OPERATING ELONGATE DISPLAY MEMBERS AT SIGNS FOR CONSECUTIVE, REPEATED PRESENTATION OF SERIES OF IMAGES

[75] Inventor: Stig E. A. Stigsson, Dio, Sweden

[73] Assignee: Prisma Skyltreklam AB, Malmo, Sweden

[21] Appl. No.: 838,369

[22] Filed: Feb. 19, 1992

[30] Foreign Application Priority Data

Mar. 1, 1991 [SE] Sweden ............................... 9100587

[51] Int. Cl.[5] ........................ F16H 27/08; G09F 11/02

[52] U.S. Cl. .................................... 74/84 R; 74/435; 74/665 GB; 40/505

[58] Field of Search .................... 74/84 R, 411.5, 435, 74/665 GB; 40/504, 505

[56] References Cited

U.S. PATENT DOCUMENTS

| | | | |
|---|---|---|---|
| 1,399,409 | 12/1921 | Sleder | 40/505 |
| 1,461,047 | 7/1923 | Ray | 40/505 |
| 1,463,108 | 7/1923 | Willison et al. | 40/505 |
| 1,785,204 | 12/1930 | Nelson et al. | 40/505 |
| 1,865,725 | 7/1932 | Raves | 40/505 |
| 2,277,323 | 3/1942 | Hjermstad | 40/505 |
| 3,143,004 | 8/1964 | Haskin, Jr. | 74/665 GB |
| 4,461,106 | 7/1984 | Lawson | 40/505 |

FOREIGN PATENT DOCUMENTS

| | | | |
|---|---|---|---|
| 1030819 | 3/1953 | France | 40/505 |
| 2235328 | 2/1991 | United Kingdom | 40/505 |

*Primary Examiner*—Leslie A. Braun
*Assistant Examiner*—Julie Krolikowski
*Attorney, Agent, or Firm*—Tarolli, Sundheim & Covell

[57] ABSTRACT

The present invention relates to a driving device for driving or operating elongate display members at signs for consecutive, repeated presentation of series of images, whereby said elongate display members (2) are driven through pairs of gear wheels (15, 16) having conical teeth and whereby a driving gear wheel (15) in each pair of gear wheels is provided on a drive shaft (6) and a driven gear (16) wheel in each pair is operatively connected with the elongate display member (2) to be driven. In this driving device, for being able to rotate the driving unit forming part thereof continuously in one and same direction of rotation and to ensure that the elongate display members can not come "out of phase" neither during rotation nor when they stand still in their display positions, the driving gear wheel (15) comprises a gear sector (20) which occupies only a part of the periphery of said driving gear wheel (15) such that said driving gear wheel (15), is in driving engagement with the driven gear wheel (16) only during a part of a revolution of said driving gear wheel (15) and the drive shaft (6) has a lock (21) which is provided to cooperate with said driven gear wheel (16) or with members non-rotatably connected therewith in such a manner that said driven gear wheel (16) is blocked against rotation during that part of the revolution of said driving gear wheel (15) when the gear sector (20) of said driving gear wheel (15) is out of driving engagement with the teeth (18) of said driven gear wheel (16).

10 Claims, 6 Drawing Sheets

Fig. 5
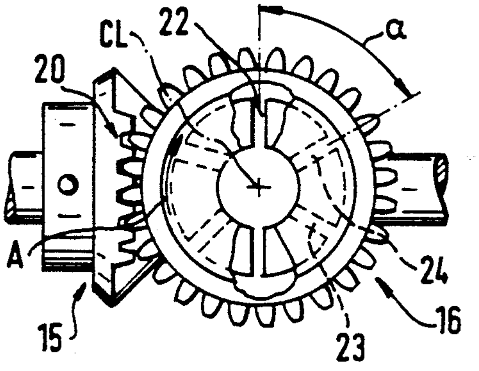
Fig. 7
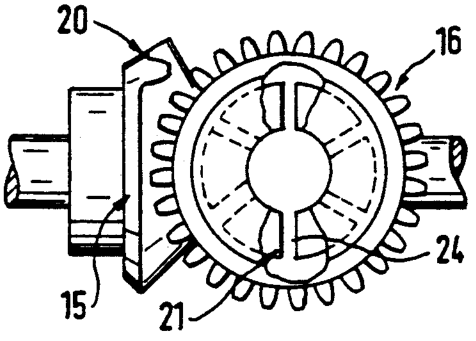
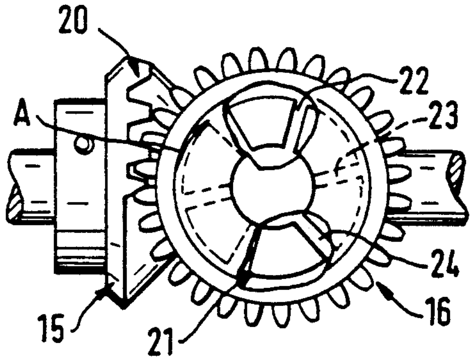
Fig. 6
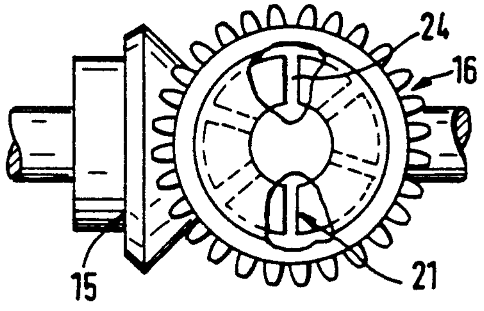
Fig. 8
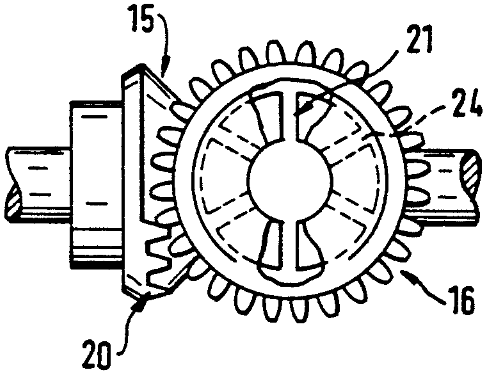
Fig. 9

DRIVING DEVICE FOR DRIVING OR OPERATING ELONGATE DISPLAY MEMBERS AT SIGNS FOR CONSECUTIVE, REPEATED PRESENTATION OF SERIES OF IMAGES

FIELD OF THE INVENTION

The present invention relates to a driving device for driving or operating elongate display members at signs for consecutive, repeated presentation of series of images whereby said elongate display members are driven through pairs of gear wheels having conical teeth and whereby a driving gear wheel in each pair of gear wheels is provided on a drive shaft and a driven gear wheel in each pair is operatively connected with the elongate display member to be driven.

In many driving devices for driving elongate display members of the above type it has hitherto been necessary to carry out the driving with a motor which is programmed to stop each time the display members are standing still in their display positions. At e.g. trilateral, elongate display members it has therefore been necessary to stop the motor three times during each revolution for displaying all three sides. Since signs for consecutive, repeated display or presentation of series of images is in continuous operation day and night throughout the year, the driving motor must be capable of performing an enormous number of starts and stops, thereby making heavy demands upon the motor and the control device therefor. This means e.g. that either expensive motor units must be used or frequent shutdowns must be allowed for.

Where the driving devices are constructed such that the motor can rotate continuously without stopping and starting, it has up to now not been possible to eliminate the risk that the display members come "out of phase" i.e. are dislodged in an impermissible manner during rotation or when standing still in their display positions. The display members can be brought "out of phase" by gusts of wind, heavy rain or other outer circumstances and shutdowns of the driving device can thereby occur.

It has hitherto neither been possible in driving devices which permit rotation of the elongate display members in one direction as well as the opposite direction, to eliminate the risk for that said display members are rotated in an impermissible manner when they are standing still in their display positions.

SUMMARY OF THE INVENTION

The object of the present invention is to eliminate these and other problems in driving devices of the above type and this is arrived at according to the invention by providing said driving device with the characterizing features of claim 1.

While the driving device is provided with said characterizing features, it is ensured that a driving motor can be used which rotates the drive shaft of the driving device continuously in one direction of rotation, i.e. without starting and stopping the motor all the time. Furthermore, it is ensured that the elongate display members can not come "out of phase" during rotation or when standing still in their display positions. It is also possible to operate the driving motor in the opposite direction if it is desired to rotate the display members also in this opposite direction, and said display members are thereby also prevented from being brought "out of phase".

DESCRIPTION OF THE DRAWINGS

The invention will be further described below with reference to the accompanying drawings, wherein

FIG. 5 schematically illustrates members of the driving device in their mutual positions during a driving moment;

FIG. 6 schematically illustrates the same members in their mutual positions when the driving moment is close to its termination;

FIG. 7 schematically illustrates said members in their mutual positions when the driving moment has ceased and a locking moment started;

FIG. 8 schematically illustrates said members in their mutual positions during the locking moment;

FIG. 9 schematically illustrates said members in their mutual positions when the locking moment has ceased and a new driving moment started.

DETAILED DESCRIPTION

Figure 1:
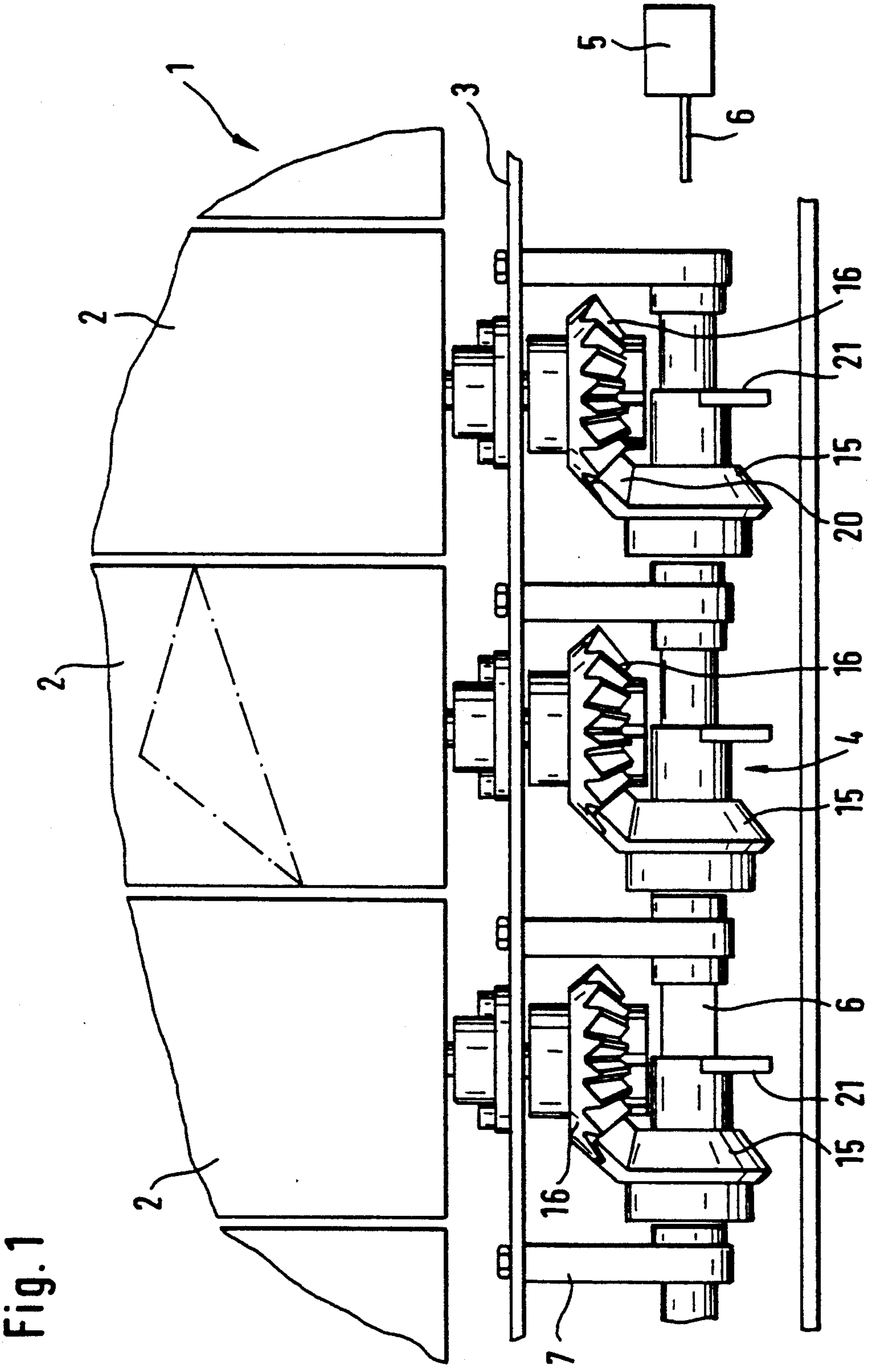
FIG. 1 is a front view of a portion of a sign for consecutive, repeated presentation of series of images and provided with a driving device according to the invention.

FIG. 1 illustrates a portion of a sign 1 for consecutive, repeated presentation of series of images, wherein all elongate display members 2 forming part of the sign are rotated either simultaneously for obtaining an effect where said display members at the same moment together define an image or wherein one starts to rotate one or more display members 2 in any part of the sign 1, whereafter successive display members located after each other are rotated for providing a successively growing or "rolling" sign 1.

Said sign 1 comprises a four side frame consisting of frame members of which only a lower frame member 3 is shown in FIG. 1. Essential parts of the driving device 4 is built into this lower frame member 3 and the elongate display members 2 are down below pivotally journalled in said frame member 3. The display members 2 are also, at the top, pivotally journalled in an upper frame member of said four side frame.

In the embodiment shown, the elongated display members 2 are trilateral, which has been indicated by dashed and dotted lines in one of the display members in FIG. 1 and the sign 1 is functioning such that a first side of all display members 2 together define an image, a second side of all display members together define a second image and a third side of all display members together define a third image. Said images are shown for a predetermined period of time depending on how long the display members stand still between successive images.

Figure 10:
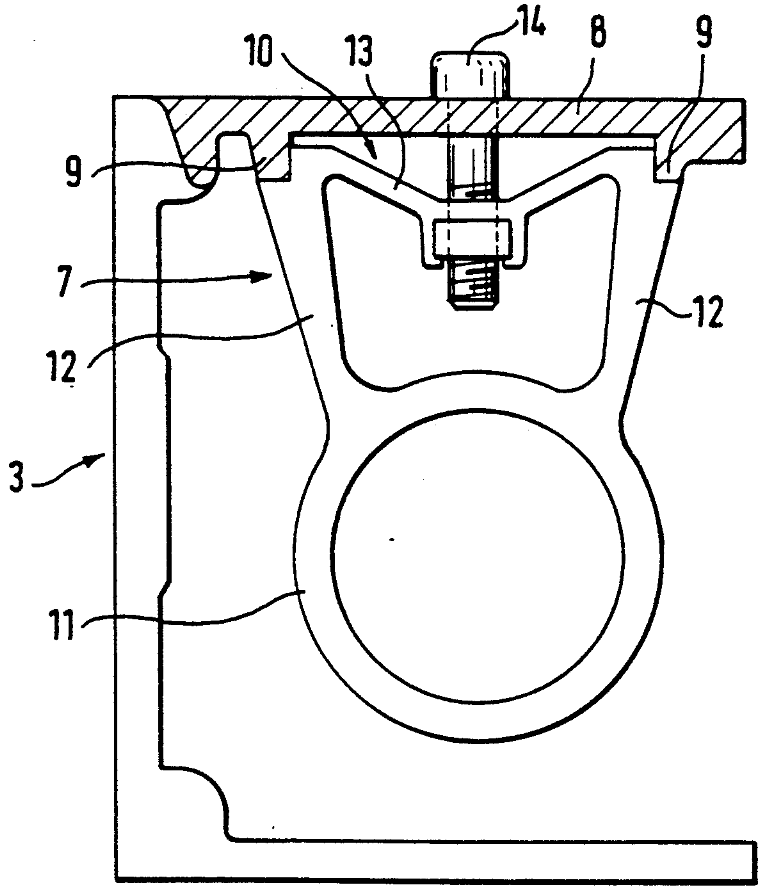
FIG. 10 illustrates a bearing element adapted for the driving devices.

The driving device 4 comprises a driving unit 5, preferably an electric motor, schematically illustrated in FIG. 1 and mounted in a suitable manner on the frame or the lower frame member 3 thereof. The driving unit 5 operates a drive shaft 6 which is rotatably mounted in a suitable number of bearing elements 7 provided in the lower frame member 3. Each such bearing element 7 is preferably mounted in an upper shank 8 of said lower frame member 3. For permitting this mounting of bearing elements 7, this upper shank 8 preferably has two longitudinal flanges 9 (see FIG. 10) with inner sides inclined in such a way that they define a groove 10 which is expanding in a direction towards said upper shank 8. The bearing element 7 includes a bearing sleeve 11 for the drive shaft 6 and two flanges 12 extending therefrom, whereby said flanges are shaped such that they together define a portion of said bearing element which is insertable into the groove 10 and which engages the longitudinal flanges 9. Both flanges 12 are at their outer ends connected to each other through a clamping portion 13, through which the bearing element 7 is clampable onto the upper shank 8 by means of a bolt 14. The bolt 14 is preferably located centrally in the clamping portion 13 and said portion 13 is preferably inclining in an obliquely inward direction such that those parts of the clamping portion 13 located closest to the flanges 12 are situated farther from the upper shank 8 than central parts of said clamping portion cooperating with the bolt 14. While the flanges 12 and clamping portion 13 have said shape and elastic properties, said flanges 12 are clamped in a direction towards the upper shank 8 and at the same time outwards against its longitudinal flanges 9 when the bolt 14 is tightened.

For operating each elongate display member 2, the driving device 4 comprises a pair of gear wheels 15, 16 having conical teeth 17, 18. One gear wheel of said pair of gear wheels is a driving gear wheel 15 which is non-rotatably mounted on the drive shaft 6 and the gear wheel cooperating therewith is a driven gear wheel 16 which is rotatably mounted in the upper shank 8 of the lower frame member 3 through a suitable bearing 19. The driven gear wheel 16 is operatively connected with the respective elongate display member 2 when this member is placed in operating position in the frame.

The driving gear wheel 15 has a gear sector 20 which occupies only a portion of the periphery of said driving gear wheel, such that said gear wheel 15 engages the driven gear wheel 16 only during a part of a revolution of said driving gear wheel. This means that the driven gear wheel 16 and thereby the associated elongate display member 2 are rotated only during a part of a revolution of the driving gear wheel 15, while said driven gear wheel 16 and associated display member 2 stand still during the remaining part of the revolution of said driving gear wheel 15.

In order to ensure that the driven gear wheel 16 and associated elongate display member 2 do not come "out of phase" during rotation or when standing still, the drive shaft 6 has a lock means 21 which is provided to cooperate with the driven gear wheel 16 or with members non-rotatably connected therewith in such a manner that the driven gear wheel 16 is blocked against rotation during that part of a revolution of the driving gear wheel 15 the said gear sector 20 of said driving gear wheel is not engaging the teeth 18 of the driven gear wheel 16.

The lock means 21 is preferably provided to block the driven gear wheel 16 against rotation when said driven gear wheel is rotated a part of a revolution by the driving gear wheel 15. Since the illustrated elongate display members 2 are trilateral and thus shall stand still three times during each revolution, the lock means 21 is in this embodiment provided to block the driven gear wheel 16 three times during each revolution, namely first in a first position and thereafter in a second position when the driving gear wheel 15 has rotated the driven gear wheel 16 120° and then again in a third position when said driving gear wheel 15 has rotated said driven gear wheel 16 another 120°.

Furthermore, the gear sector 20 of the driving gear wheel 15 preferably occupies such part of the periphery of said driving gear wheel that the driven gear wheel 16 during each revolution on the drive shaft 6 is rotated a number of degrees depending on the number of sides on the elongate display members 2 and/or depending on the number of sides on said display members to be displayed.

In the embodiment shown, the lock means consists of a cam disk 21 which is non-rotatably mounted on the drive shaft 6 and protrudes therefrom in radial direction. The driven gear wheel 16 has slots 22, 23, 24 into which the lock means 21 can be inserted and through which said lock means can pass when the driving gear wheel 15 rotates without the gear sector 20 thereof engaging the driven gear wheel 16. In order to avoid meshing in the teeth 18 of the driven gear wheel 16, these slots 22, 23, 24 can be provided in a member 25 protruding from the teeth-carrying portion of the driven gear wheel 16 in a direction towards the drive shaft 6 and being non-rotatably connected with said teeth-carrying portion.

The three slots 22, 23, 24 extend across the member 25 and they intersect each other in the centre line CL (see FIG. 5) of the driven gear wheel 16. Furthermore, the angle between the slots 22 and 23 is equal to 60° as is the angle between the slots 23 and 24. The cam disk 21 is preferably centered with an extension of the centre line CL (see FIG. 2) of the driven gear wheel 16.

Figure 4:
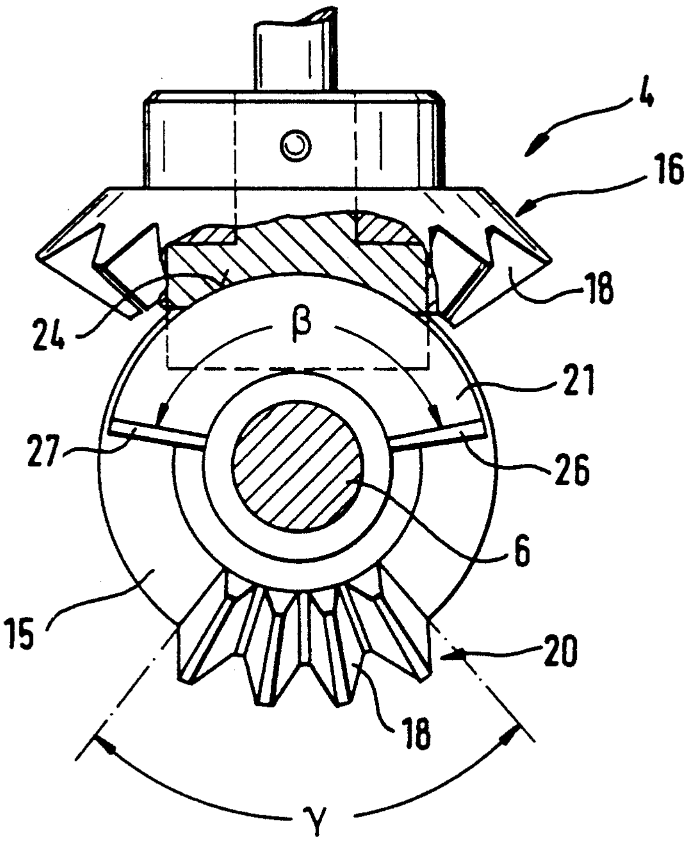
FIG. 4 is a view and section IV—IV in FIG. 3.

In the embodiment shown, the cam disk 21 extends along a sector having an angle of about 160° and the gear sector 20 along an angle of about 80° (see FIG. 4) if said gear sector has four teeth 17 or about 100° if it has five teeth, but said angles and may vary depending on the design of the members forming part of the driving device 4.

One or preferably both end edges 26, 27 of the cam disk 21, reaching one of the slots 22, 23, 24 when said cam disk is rotated to lock positions SL, are preferably sharpened. In combination herewith or as an alternative hereto, the inlets of the slots 22, 23, 24 for the cam disk 21 can be broadened.

Figure 2:
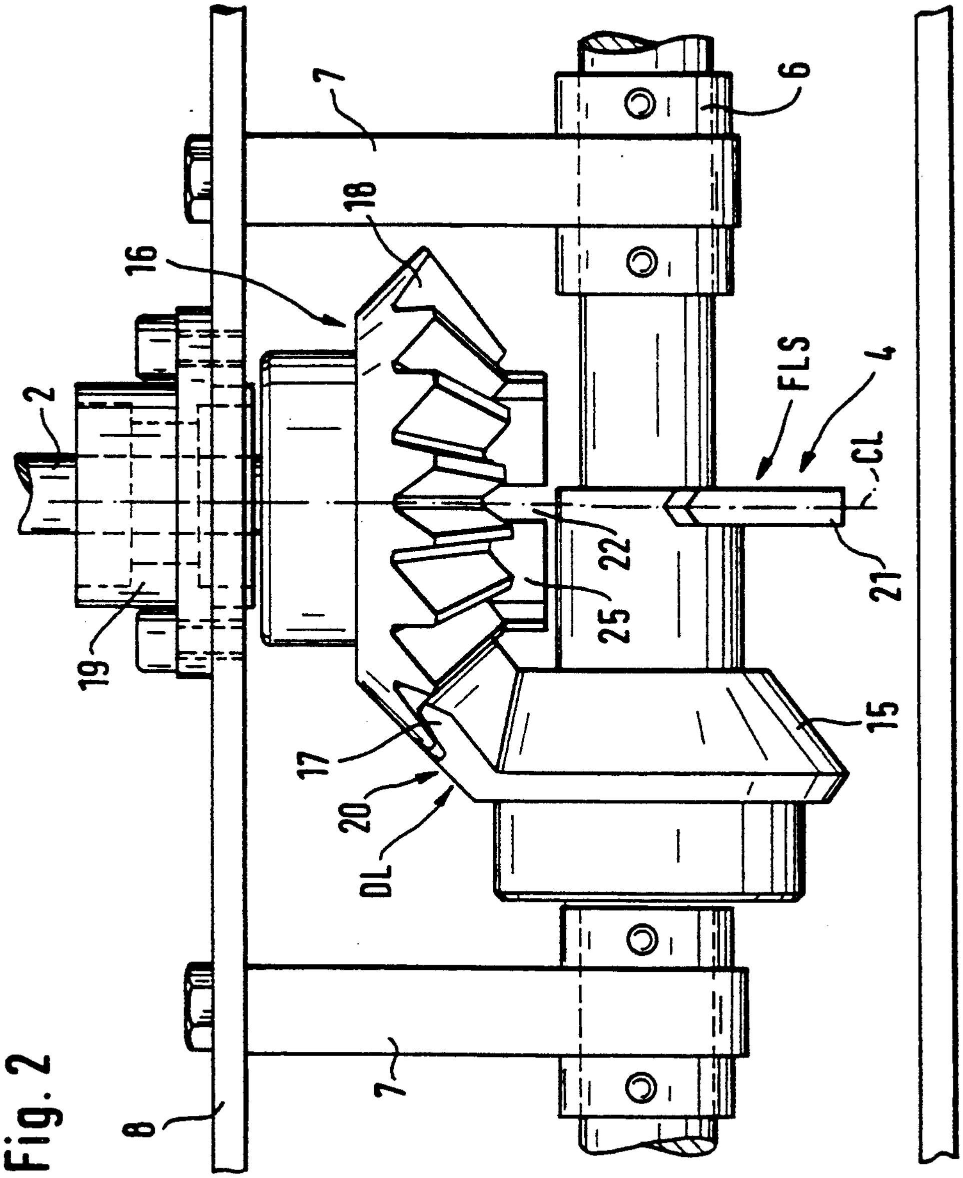
FIG. 2 is a front view of a portion of the driving device according to the invention during a driving moment.
Figure 3:
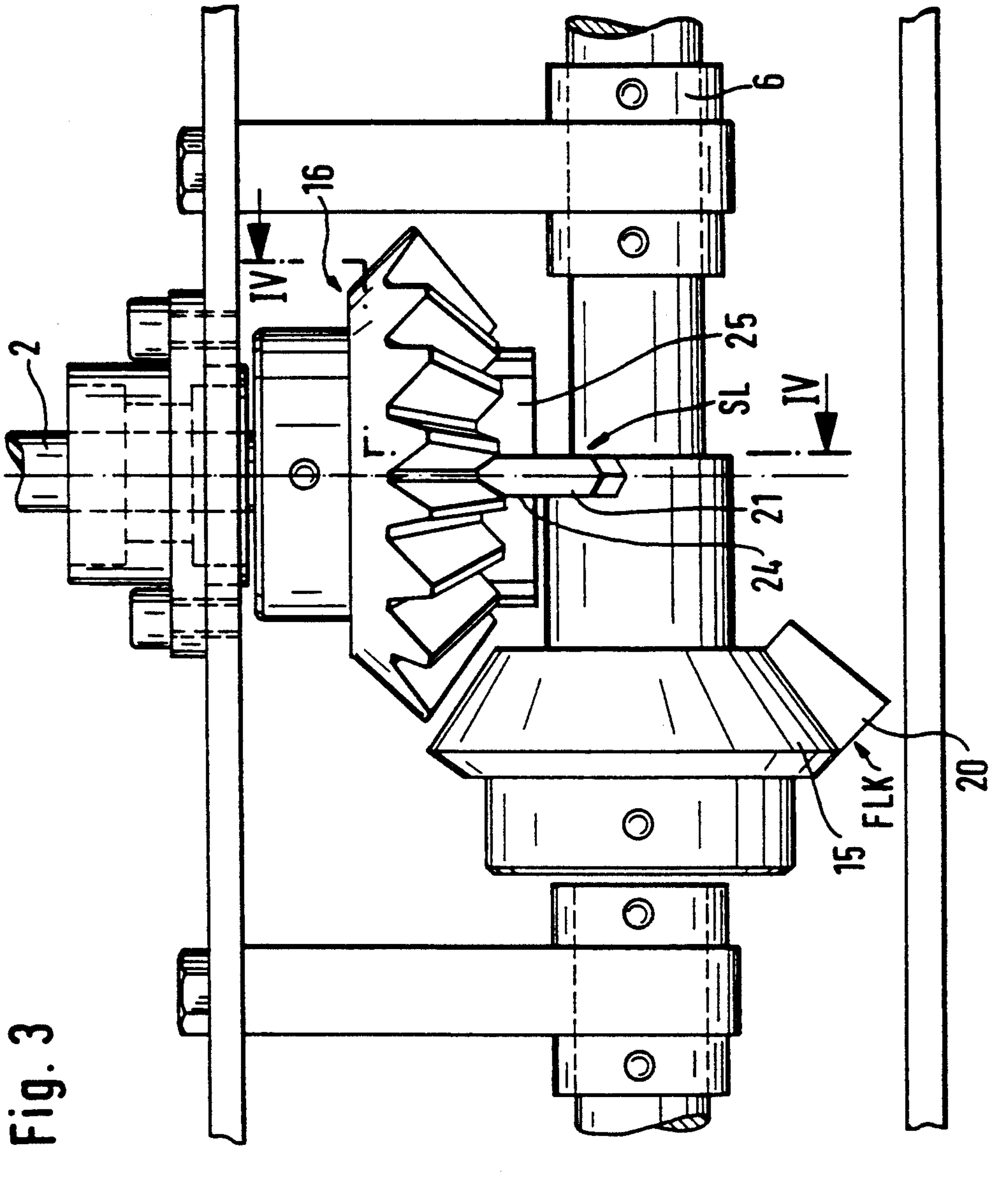
FIG. 3 is the same view as in FIG. 2 but with the driving device in a locking moment.

In FIGS. 1 and 2, the gear sector 20 of the driving gear wheel 15 is shown in driving position DL with the teeth 18 of the driven gear wheel 16, while the cam disk 21 is in a free or neutral position FLS. In FIG. 3 however, the gear sector 20 is shown in its free or neutral position FLK and the cam disk 21 in lock position SL.

In FIGS. 5–9 it is schematically shown various moments during the engagement or meshing of the gear wheels 15, 16 with each other. Thus, positions are shown in FIG. 5, wherein the gear sector 20 rotates the driven gear wheel 16 in the direction of an arrow A. In FIG. 6 positions are shown, wherein the gear sector 20 has rotated the driven gear wheel 16 a further distance in the direction of the arrow A, whereby the cam disk 21 with one end edge 26 is approaching said driven gear wheel 16. In FIG. 7 positions are shown, wherein the gear sector 20 just left its engagement with the driven gear wheel 16 and wherein the cam disk 21 immediately thereafter has protruded into the slot 22 for blocking the driven gear wheel 16 against rotation. In FIG. 8 positions are shown, wherein the cam disk 21 has moved farther into the slot 22 filling it up and in FIG. 9 positions are shown, wherein said cam disk 21 just left the slot 22 and wherein the gear sector 20 once again engages or meshes with the teeth 18 of the driven gear wheel 16 for rotation thereof.

This procedure is continuously repeated for rotating the elongate display members 2 to their display positions, stop rotation of said display members having reached these display positions and block said display members against rotation as long as they are in their display positions.

The driving unit 5 thereby rotates the drive shaft 6 continuously in the same direction and when required, the rotary speed can be altered. The driving unit 5 preferably also permits continuous rotation of the drive shaft 6 in the opposite direction if one wish to rotate the elongate display members 2 in this opposite direction.

The driving device described above may vary within the scope of the following claims with regard to location and design of the members forming part thereof. As examples of alternative embodiments of the driving device it can be mentioned that its lock means 21 may be of another type than a cam disk and those members of the driven gear wheel 16 cooperating with said lock means need not be slots. The number of teeth in the gear sector 20 and in the driven gear wheel 16 may vary. Furthermore, the driving device 4 can be used for elongate display members 2 with another number of sides than three and said driving device can be located in another way than in a U-shaped frame member 3. Additionally, the elongate display members 2 need not be vertically directed, but can instead be located horizontally.

I claim:

1. Driving device for driving or operating elongate display members of signs for consecutive, repeated presentation of series of images, whereby said elongate display members (2) are driven through pairs of gear wheels (15, 16) having conical teeth (17, 18) and whereby a driving gear wheel (15) in each pair of gear wheels is provided on a drive shaft (6) and a driven gear wheel (16) in each pair is operatively connected with the elongate display members (2) to be driven, characterized in that the driving gear wheel (15) comprises a gear sector (20) which occupies only a part of a periphery of said driving gear wheel (15) such that said driving gear wheel (15) is in driving engagement with the driven gear wheel (16) only during a part of a revolution of said driving gear wheel (15) and that the drive shaft (6) has a lock means (21) which is provided to cooperate with said driven gear wheel (16) or with members non-rotatably connected therewith in such a manner that said driven gear wheel (16) is blocked against rotation during that part of the revolution of said driving gear wheel (15) when the gear sector (20) of said driving gear wheel (15) is out of driving engagement with the teeth (18) of said driven gear wheel (16).

2. Driving device according to claim 1, characterized in that the lock means (21) is provided to block the driven gear wheel (16) against rotation after it has been rotated a part of a revolution by the driving gear wheel (15).

3. Driving device according to claim 2, characterized in that the lock means (21) is provided to block the driven gear wheel (16) three times for each revolution thereof, namely first in a first position and thereafter in a second position when the driving gear wheel (15) has rotated said driven gear wheel (16) 120° and then again in a third position when said driving gear wheel (15) has rotated said driven gear wheel (16) another 120°.

4. Driving device according to claim 1, characterized in that the gear sector (20) of the driving gear wheel (15) occupies such a part of the periphery of said driving gear wheel that the driven gear wheel (16) during each revolution on the drive shaft (6) is rotated a number of degrees depending on a number of sides on the elongate display members (2) and/or depending on a number of sides on said display members to be displayed.

5. Driving device according to claim 1, characterized in that the lock means (21) is provided to be set in a lock position (SL) for blocking the driven gear wheel (16) against rotation immediately after the gear sector (20) of the driving gear wheel (15) has left its driving engagement with the teeth (18) of said driven gear wheel (16) and that said lock means (21) is also provided to leave its lock position (SL) to permit rotation of the driven gear wheel (16) just before the gear sector (20) of the driving gear wheel (15) engages or meshes with the teeth (18) of said driven gear wheel (16).

6. Driving device according to claim 1, characterized in that the lock means consists of a cam disk (21) protruding radially from the drive shaft (6) and that the driven gear wheel (16) or members (25) non-rotatably connected therewith are provided with slots (22, 23, 24) for this cam disk (21).

7. Driving device according to claim 6, characterized in that the cam disk (21) is centered with an extension of the center line (CL) of the driven gear wheel (16).

8. Driving device according to claim 6, characterized in that at least one such end edge (26 and/or 27) of the cam disk (21) which reaches a slot (22, 23, 24) adapted therefor in the driven gear wheel (16) or in a member (25) non-rotatably connected therewith is sharpened and/or that an inlet for said cam disk (21) in such a slot (22, 23, 24) in said driven gear wheel (16) or in a member (25) non-rotatably connected therewith is broadened.

9. Driving device according to claim 1, characterized in that it comprises a driving unit (5) which is provided to rotate the drive shaft (6) continuously in a direction of rotation for driving the elongate display members (2) for consecutive, repeated presentation or display of a series of images, whereby said display members (2) remain in display positions when the gear sector (20) of the driving gear wheel (15) has left its driving engagement with the teeth (18) of the driven gear wheel (16) and whereby said driving unit (5) preferably is provided to rotate said drive shaft (6) in one direction as well as an opposite direction.

10. Driving device according to claim 1, whereby the driven gear wheel (16) is journalled in a part of a frame member (3), characterized in that a bearing element (7) for the drive shaft (6) is mounted in a same part (8) of the frame member (3) as said driven gear wheel (16) or a bearing (19) therefor is mounted in.

* * * * *